United States Patent
Imagawa

(10) Patent No.: US 11,888,840 B2
(45) Date of Patent: Jan. 30, 2024

(54) APPARATUS AND METHOD FOR SELECTION AND TRANSMISSION OF SERVER CERTIFICATE

(71) Applicant: Mitsubishi Electric Corporation, Tokyo (JP)

(72) Inventor: Masanori Imagawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 220 days.

(21) Appl. No.: 16/754,488

(22) PCT Filed: Nov. 9, 2017

(86) PCT No.: PCT/JP2017/040360
§ 371 (c)(1),
(2) Date: Apr. 8, 2020

(87) PCT Pub. No.: WO2019/092825
PCT Pub. Date: May 16, 2019

(65) Prior Publication Data
US 2020/0396215 A1     Dec. 17, 2020

(51) Int. Cl.
*H04L 9/40* (2022.01)
*H04L 9/32* (2006.01)

(52) U.S. Cl.
CPC ........ *H04L 63/0823* (2013.01); *H04L 9/3263* (2013.01); *H04L 9/3268* (2013.01)

(58) Field of Classification Search
CPC .. H04L 63/0823; H04L 9/3268; H04L 9/3263
USPC .......................................................... 726/6
See application file for complete search history.

(56) References Cited

U.S. PATENT DOCUMENTS

| | | | |
|---|---|---|---|
| 8,621,078 B1* | 12/2013 | Mukerji | H04L 63/0823 709/225 |
| 9,288,059 B2* | 3/2016 | Nix | G06F 21/35 |
| 2006/0075219 A1* | 4/2006 | Callaghan | H04L 63/0823 713/156 |
| 2006/0075279 A1* | 4/2006 | Cameros | H04L 69/40 714/4.1 |

(Continued)

FOREIGN PATENT DOCUMENTS

| | | |
|---|---|---|
| JP | 2005-303784 A | 10/2005 |
| JP | 2016-163154 A | 9/2016 |

OTHER PUBLICATIONS

The SSL Alternative—You can ditch your IPsec and tunneling VPNs and use SSL to give remote users secure access to Web-enabled and conventional applications. Neoteris Access Series 5000 sets the security standard (Year: 2003).*

(Continued)

*Primary Examiner* — Cheng-Feng Huang
(74) *Attorney, Agent, or Firm* — POSZ LAW GROUP, PLC

(57) ABSTRACT

To include a storage unit to store a plurality of server certificates different in subjects; and a communication unit to receive a connection request for communication established by using any one of the plurality of server certificates and to transmit a single server certificate selected out of the plurality of server certificates to a source of the connection request according to a source internet protocol (IP) address of the connection request.

3 Claims, 9 Drawing Sheets

(56) References Cited

U.S. PATENT DOCUMENTS

| | | | |
|---|---|---|---|
| 2006/0274899 A1* | 12/2006 | Zhu | H04L 63/02 380/281 |
| 2007/0234043 A1* | 10/2007 | Miyazawa | H04L 9/3263 713/156 |
| 2013/0198511 A1* | 8/2013 | Yoo | H04L 63/0823 713/156 |
| 2013/0283041 A1* | 10/2013 | Vajirkar | H04L 61/4511 713/156 |
| 2014/0298415 A1* | 10/2014 | Xie | H04L 63/02 726/3 |
| 2015/0350196 A1* | 12/2015 | Toyonaga | H04L 63/0876 713/156 |
| 2016/0254916 A1* | 9/2016 | Miyake | H04L 9/3263 713/175 |
| 2017/0171172 A1* | 6/2017 | Sullivan | G06F 21/33 |

OTHER PUBLICATIONS

Extended European Search Report dated Oct. 16, 2020 issued in corresponding EP patent application No. 17931445.5.
Office Action dated Mar. 9, 2022 issued in corresponding European Patent Application No. 17 931 445. 5.

* cited by examiner

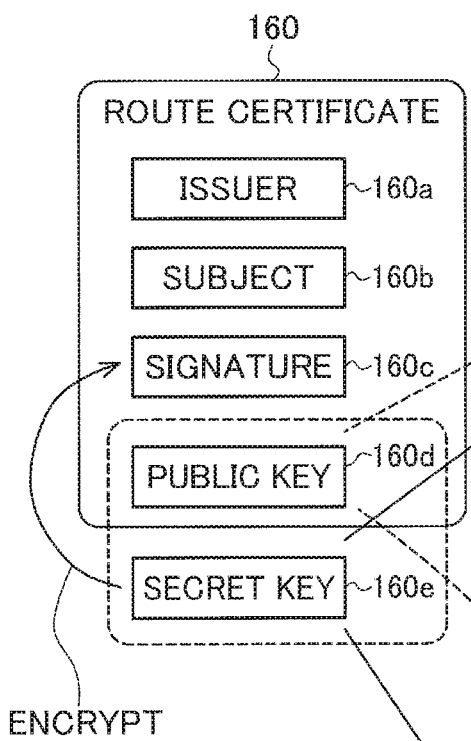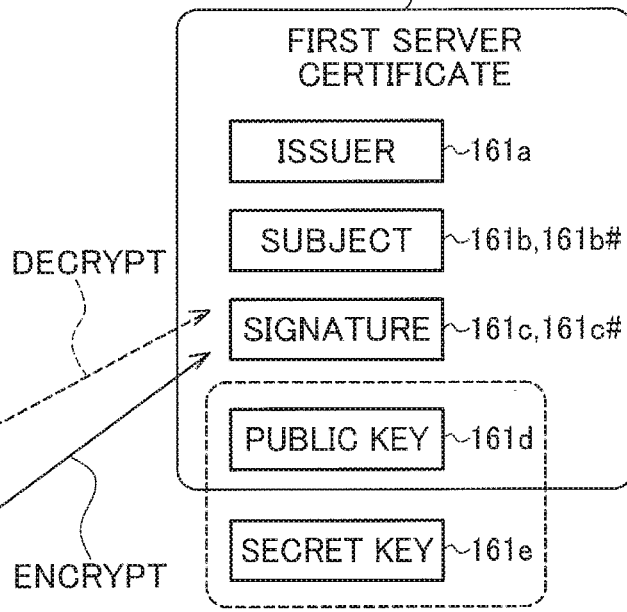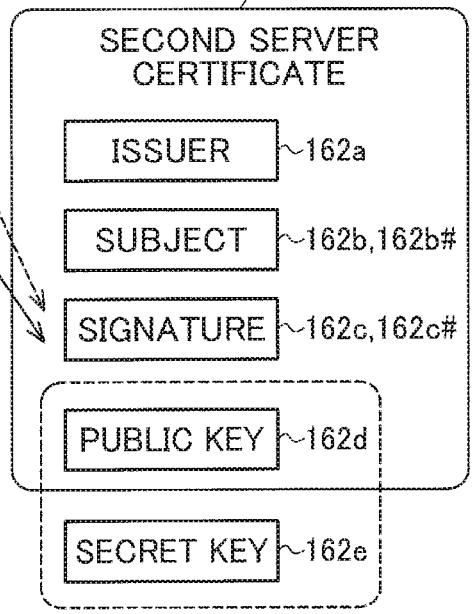

FIG. 4
| SOURCE | SOURCE IP ADDRESS | DESTINATION IP ADDRESS BEFORE NAT CONVERSION | DESTINATION IP ADDRESS AFTER NAT CONVERSION | RECOGNIZED DESTINATION IP ADDRESS |
|---|---|---|---|---|
| OUTSIDE PC | SECOND GLOBAL IP ADDRESS | FIRST GLOBAL IP ADDRESS | FIRST PRIVATE IP ADDRESS | FIRST PRIVATE IP ADDRESS |
| LOCAL PC | SECOND PRIVATE IP ADDRESS | – | – | FIRST PRIVATE IP ADDRESS |
FIG. 5A
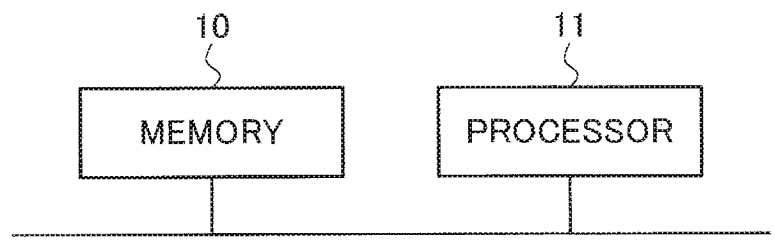
FIG. 5B
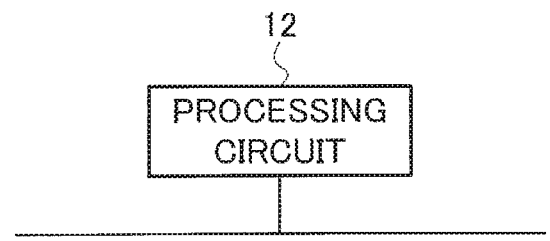

FIG. 9

| DESTINATION NETWORK | GATEWAY ADDRESS |
|---|---|
| SECOND LAN SUBNET | FOURTH PRIVATE IP ADDRESS |
| THIRD LAN SUBNET | FIFTH PRIVATE IP ADDRESS |
| 0.0.0.0/0 | FIFTH PRIVATE IP ADDRESS |

FIG. 10

| GATEWAY ADDRESS | DISTRIBUTED SERVER CERTIFICATE |
|---|---|
| FOURTH PRIVATE IP ADDRESS | FIRST SERVER CERTIFICATE |
| FIFTH PRIVATE IP ADDRESS | THIRD SERVER CERTIFICATE |

FIG. 11

| TARGET NETWORK | DISTRIBUTED SERVER CERTIFICATE |
|---|---|
| SECOND LAN SUBNET | FIRST SERVER CERTIFICATE |
| THIRD LAN SUBNET | THIRD SERVER CERTIFICATE |
| 0.0.0.0/0 | THIRD SERVER CERTIFICATE |

APPARATUS AND METHOD FOR SELECTION AND TRANSMISSION OF SERVER CERTIFICATE

CROSS REFERENCE TO RELATED APPLICATION

This application is a U.S. national stage application of International Patent Application No. PCT/JP2017/040360 filed on Nov. 9, 2017, the disclosure of which is incorporated herein by reference.

TECHNICAL FIELD

The present invention relates to an information processing apparatus and an information processing method, and particularly to an information processing apparatus and an information processing method for performing communication by using server certificates.

BACKGROUND

Currently, information processing apparatuses for controlling household electrical appliances, such as an equipment management apparatus, are generally operated on the Web, by using personal computers (PCs) or other devices. Communication between an information processing apparatus and a PC is performed by using the hypertext transfer protocol (HTTP) without encryption in many cases, but communication by using the hypertext transfer protocol secure (HTTPS) for encrypting communication to prevent falsification of the communication is becoming widespread.

Communication by using HTTPS requires a server certificate to ensure validity of a server apparatus. In a case where an information processing apparatus is operated on the Web, the information processing apparatus serves as a server apparatus.

In a server certificate, an internet protocol (IP) address or a domain name of an information processing apparatus is included as a subject in some cases. A server certificate is generally issued by a third party certificate authority. However, since an IP address or a domain name of an information processing apparatus has not been determined yet at the time of shipment of the information processing apparatus, a server certificate issued by a third party certificate authority cannot be registered in the information processing apparatus at the shipment.

Thus, when the information processing apparatus operates, the information processing apparatus itself serves as a certificate authority, and after an IP address or a domain name of the information processing apparatus is determined, the information processing apparatus itself generates a server certificate.

Usually, in an HTTPS server that is a server apparatus supporting HTTPS, only a single server certificate can be registered and the HTTPS server responds with only the registered single server certificate to any network connected to the HTTPS server.

However, in a case where an IP address is included in the server certificate as a subject of the server certificate, for example, if a plurality of IP addresses are registered on the information processing apparatus operating as the HTTPS server, the information processing apparatus responds with different IP addresses to the respective connected networks. Different IP addresses require different server certificates for use in response. However, since a usual HTTPS server can use only a single server certificate to respond, HTTPS does not operate correctly in some cases.

On the other hand, a printer described in Patent Reference 1 generates a wired server certificate including a wired host name as wired owner name information and a wireless server certificate including a wireless host name as wireless owner information. The printer provides a device communicating through a wired interface (I/F) with the wired server certificate, and provides a device communicating through a wireless I/F with the wireless server certificate. In this manner, communication using a secure sockets layer (SSL) can be established through both of the wired I/F and the wireless I/F.

PATENT REFERENCE

Patent Reference 1: Japanese Patent Application Publication No. 2016-163154

In the conventional technique, however, it is assumed that the printer includes two physically different network interfaces. Thus, the conventional technique cannot be applied to a network configuration in which a PC is connected to an information processing apparatus having only a single network interface by using a plurality of destinations.

SUMMARY

It is therefore an object of the present invention to enable selection of an appropriate server certificate out of a plurality of server certificates according to a network configuration.

An information processing apparatus according to one aspect of the present invention includes: a storage unit to store a plurality of server certificates different in subjects; and a communication unit to receive a connection request for communication to be established by using any one of the plurality of server certificates and to transmit a single server certificate to a source of the connection request, the single server certificate being selected out of the plurality of server certificates according to a source internet protocol (IP) address of the connection request.

An information processing method according to an aspect of the present invention includes: receiving a connection request for communication established by using any one of a plurality of server certificates different in subjects; and transmitting a single server certificate selected out of the plurality of server certificates to a source of the connection request according to a source internet protocol (IP) address of the connection request.

In an aspect of the present invention, an appropriate server certificate can be selected out of a plurality of server certificates according to a network configuration.

BRIEF DESCRIPTION OF THE DRAWINGS

FIGS. 3A through 3C are schematic diagrams illustrating examples of a route certificate, a first server certificate, and a second server certificate in the first, second, and fourth embodiments.

FIG. 4 is a table for describing an address conversion and a destination IP address in the first embodiment.

FIGS. 5A and 5B are schematic diagrams illustrating hardware configurations in the first through fourth embodiments.

FIG. 9 is a schematic diagram illustrating an example of a routing table in the third embodiment.

FIG. 10 is a schematic diagram illustrating a first example of server certificate selection information in the third embodiment.

FIG. 11 is a schematic diagram illustrating a second example of the server certificate selection information in the third embodiment.

DETAILED DESCRIPTION

First Embodiment

Figure 1:
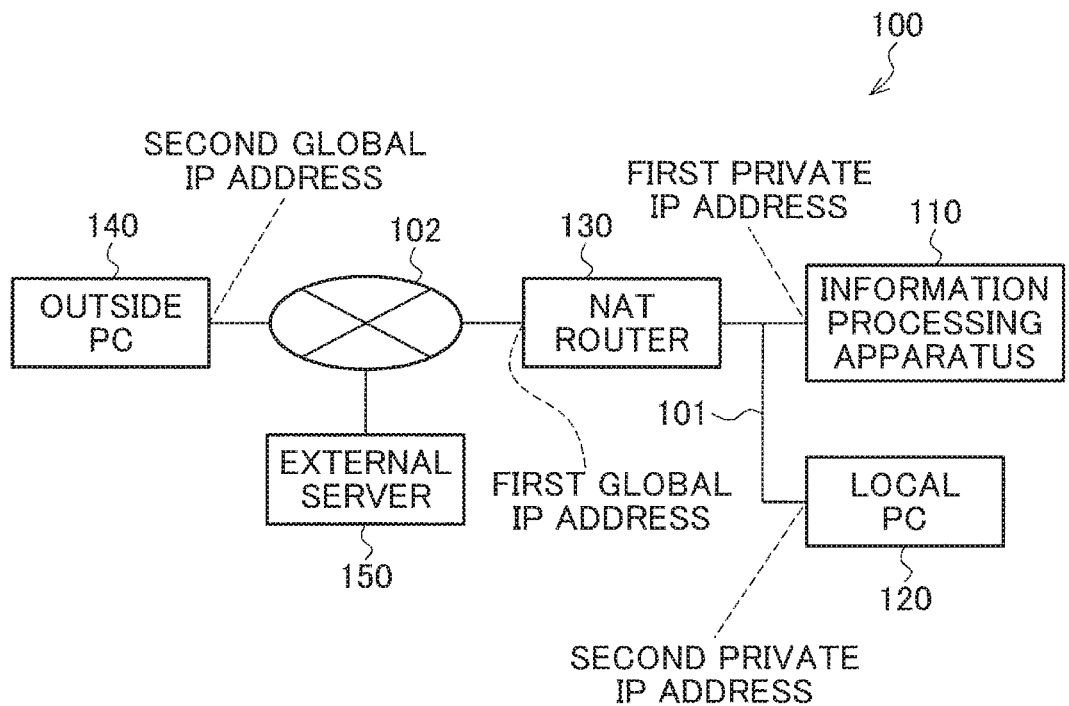
FIG. 1 is a block diagram schematically illustrating a configuration of a communication system according to a first embodiment.

FIG. 1 is a block diagram schematically illustrating a configuration of a communication system 100 according to a first embodiment.

As illustrated in FIG. 1, the communication system 100 includes an information processing apparatus 110, a local PC 120, a network address translation (NAT) router 130, an outside PC 140, and an external server 150.

The information processing apparatus 110, the local PC 120, and the NAT router 130 are connected to a local area network (LAN) 101, which is a first network.

The NAT router 130, the outside PC 140, and the external server 150 are connected to the Internet 102, which is a second network.

To the information processing apparatus 110, a first private IP address is assigned. To the local PC 120, a second private IP address is assigned. The information processing apparatus 110 and the local PC 120 belong to the same subnet. Thus, network portions of the first private IP address and the second private IP address are the same.

The outside PC 140 cannot be directly connected to the first private IP address of the information processing apparatus 110. In a case where the NAT router 130 can be used for a static NAT or a port forward, the outside PC 140 can be connected to the information processing apparatus 110 via the NAT router 130.

For example, in a case where the NAT router 130 can be used for the static NAT, when the outside PC 140 is connected to a first global IP address assigned to the NAT router 130, the NAT router 130 converts the destination address to a first private IP address, and transfers communication to the information processing apparatus 110. The first global IP address assigned to the NAT router 130 is also referred to as a preconversion IP address.

In a case where the NAT router 130 can be used for the port forward, when the outside PC 140 is connected to the first global IP address assigned to the NAT router 130 by specifying a port number assigned to the information processing apparatus 110, the NAT router 130 converts the destination address to a first private IP address and transfers communication to the information processing apparatus 110.

In the following description, the static NAT and the port forward will be collectively referred to as a static processing.

It is assumed that the NAT router 130 can be used for the static processing.

In the communication system 100 having the configuration described above, description will be given on a case where a server certificate held in the information processing apparatus 110 is only a server certificate including a first private IP address assigned to this own apparatus as a destination, as in the conventional technique.

First, in a case where the local PC 120 is connected to the information processing apparatus 110, the information processing apparatus 110 responds with the first private IP address, and the first private IP address is included in the server certificate. In this case, in the local PC 120, the address of the information processing apparatus 110 coincides with the address included in the server certificate, and thus, the local PC 120 can communicate with the information processing apparatus 110 according to the HTTPS.

On the other hand, in a case where the outside PC 140 is connected to the information processing apparatus 110, the outside PC 140 uses the first global IP address assigned to the NAT router 130 as a destination, and the NAT router 130 converts the destination to the first private IP address. The information processing apparatus 110 responds with the first private IP address, and the first private IP address is included in the server certificate. The destination to which the outside PC is connected is the first global IP address, and the first private IP address is included in the server certificate used in the response. Thus, the HTTPS does not operate correctly.

The first embodiment provides solutions for the problems described above.

Figure 2:
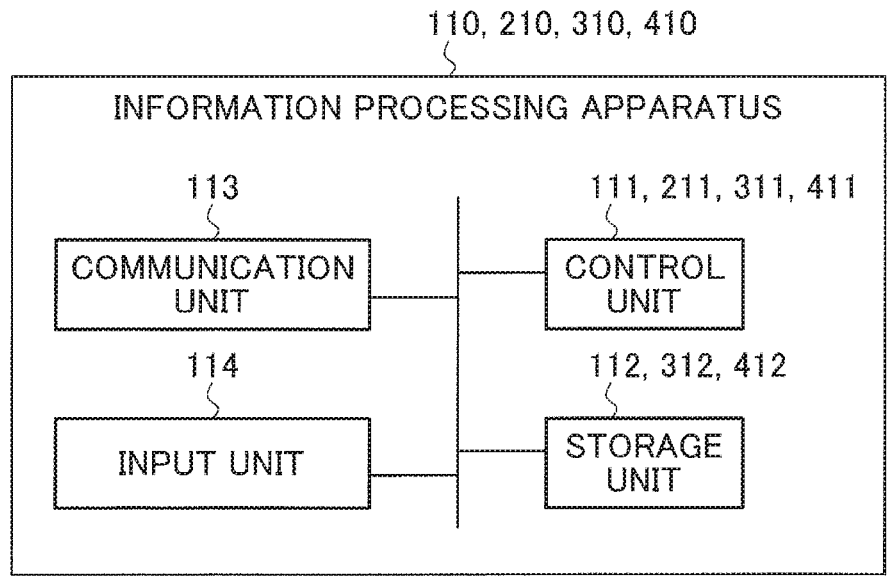
FIG. 2 is a block diagram schematically illustrating a configuration of an information processing apparatus according to first through fourth embodiments.

FIG. 2 is a block diagram schematically illustrating a configuration of the information processing apparatus 110 in the first embodiment.

The information processing apparatus 110 includes a control unit 111, a storage unit 112, a communication unit 113, and an input unit 114.

The control unit 111 controls processing in the information processing apparatus 110. For example, the control unit 111 creates a route certificate and server certificates. Specifically, the control unit 111 creates a route certificate, a first server certificate that is a server certificate for the LAN 101, and a second server certificate that is a server certificate for the Internet 102.

The control unit 111 selects a server certificate to be transmitted, in accordance with a source IP address. For example, in the first embodiment, the control unit 111 changes a server certificate to be selected out of a plurality of server certificates, depending on whether the source IP address of a connection request for communication established by using a server certificate is an IP address of the subnet to which the information processing apparatus 110 belongs or not.

First, the server certificates will be described with reference to FIGS. 3A through 3C.

A digital certificate includes an issuer and a subject of a certificate. In particular, a certificate for which the issuer and the subject are the same is called a self-signature certificate.

The self-signature certificate cannot be used as a HTTPS server certificate, because of enhanced security.

However, the self-signature certificate can be used as a route certificate.

As illustrated in FIG. 3A, a route certificate 160 includes an issuer 160a, a subject 160b, a signature 160c, and a public key 160d.

The issuer 160a of the route certificate 160 may be an arbitrary fixed name, and the subject 160b is the same as the issuer 160a.

The route certificate 160 includes the public key 160d for the route certificate 160. A secret key 160e for the route certificate 160 is paired with the public key 160d.

Based on the contents of the route certificate 160, predetermined information is encrypted with the secret key 160e to thereby generate the signature 160c. For example, hash values of the contents of the route certificate 160 are encrypted with the secret key 160e to thereby generate the signature 160c. The signature 160c is decrypted with the public key 160d, decrypted values are compared with the hash values of the contents of the route certificate 160 and thus it can be certified that the route certificate 160 has not been changed.

The route certificate 160 does not contain undefined information at the time of shipment of the information processing apparatus 110, and can be registered in the information processing apparatus 110 before the shipment of the information processing apparatus 110.

In a case where it is detected that the route certificate 160 is not stored in the storage unit 112 at start-up of the information processing apparatus 110, the control unit 111 generates a pair of the public key 160d and the secret key 160e, and then, generates the route certificate 160. The control unit 111 causes the storage unit 112 in the information processing apparatus 110 to store the generated route certificate 160.

Next, with reference to FIG. 3B, the first server certificate 161 that is a server certificate for the LAN 101 will be described.

At the time of start-up of the information processing apparatus 110, the private IP address of the information processing apparatus 110 is automatically issued according to the dynamic host configuration protocol (DHCP) or manually input by a user to the information processing apparatus 110 by using the input unit 114 of the information processing apparatus 110. At the time of shipment of the information processing apparatus 110 from a factory, a predetermined static private IP address may be registered beforehand. In the first embodiment, the static private IP address assigned to the information processing apparatus 110 is the first private IP address.

In the case where the first private IP address has been registered at the time of start-up of the information processing apparatus 110, in other words, in the case where the first private IP address has been stored in the storage unit 112, the control unit 111 checks whether the storage unit 112 stores the first server certificate 161 or not. If the first server certificate 161 is not stored, the control unit 111 generates a pair of the public key 161d and the secret key 161e, and then, generates the first server certificate 161 by using the route certificate 160 such that the subject 161b is the first private IP address. Specifically, the control unit 111 sets the subject 160b of the route certificate 160 as the issuer 161a of the first server certificate 161. Based on the contents of the first server certificate 161, the control unit 111 encrypts predetermined information with the secret key 160e corresponding to the route certificate 160 to thereby generate the signature 161c.

The thus-generated first server certificate 161 is stored in the storage unit 112.

In the case where the static private IP address of the information processing apparatus 110 is automatically issued according to DHCP, the control unit 111 generates the pair of the public key 161d and the secret key 161e at the time when the first private IP address is distributed to the information processing apparatus 110 from a DHCP server not illustrated in the drawing, and generates the first server certificate 161 by using the route certificate 160 such that the first private IP address distributed according to DHCP is set as the subject 161b.

In this embodiment, even in a case where the first server certificate 161 has been already stored in the storage unit 112, if the subject 161b of the first server certificate 161 is different from the first private IP address assigned to the information processing apparatus 110, the control unit 111 deletes the stored first server certificate 161 and then generates the first server certificate 161 again by using the first private IP address assigned to the information processing apparatus 110. The first server certificate 161 generated again is stored in the storage unit 112.

Then, with reference to FIG. 3C, the second server certificate 162 will be described.

The first global IP address is information contained in the NAT router 130 different from the information processing apparatus 110.

Thus, the user of the information processing apparatus 110 inputs the first global IP address of the NAT router 130 to the information processing apparatus 110 by using the input unit 114 so that the first global IP address can be stored in the information processing apparatus 110.

Description will now be given on how the information processing apparatus 110 automatically acquires the first global IP address of the NAT router 130, as a method different from the method of manually inputting the first global IP address by the user of the information processing apparatus 110.

As illustrated in FIG. 1, in the communication system 100, the external server 150 is connected to the Internet 102 beforehand. The external server 150 is a device different from the outside PC 140 that establishes HTTPS communication with the information processing apparatus 110. The information processing apparatus 110 connects to the external server 150 via the NAT router 130. This communication may be either encrypted communication or non-encrypted communication, and may be either HTTP communication or other communication. Here, it is assumed that the information processing apparatus 110 transmits a request for acquiring an address to the external server 150.

In the case where communication from the information processing apparatus 110 to the external server 150 is established, the NAT router 130 converts the source IP address from the first private IP address to the first global IP address, and transfers an acquisition request to the external server 150.

The external server 150 that has received the acquisition request acquires a source IP address, writes the acquired source IP address in communication data for response, and responds to the information processing apparatus 110. The source IP address acquired here is the first global IP address.

In the case where the external server 150 and the information processing apparatus 110 communicate with each other by using HTTP, the external server 150 may operate as an HTTP server, write a source IP address acquired from a REMOTE_ADDR variable included in a received HTTP header in an HTTP payload, and respond to the information processing apparatus 110 with the packet.

The information processing apparatus 110 that has received the response from the external server 150 acquires the first global IP address of the NAT router 130 from the communication data for response.

In the manner described above, when the first global IP address of the NAT router 130 is acquired through a manual input by the user or from the response from the external server 150, the control unit 111 generates the pair of the public key 162d and the secret key 162e, and then generates the second server certificate 162 as illustrated in FIG. 3C by using the route certificate 160 such that the subject 162b is the first global IP address. Specifically, the control unit 111 sets the subject 160b of the route certificate 160 as the issuer 162a of the second server certificate 162. Based on the contents of the second server certificate 162, the control unit 111 encrypts predetermined information with the secret key 160e corresponding to the route certificate 160 to thereby generate the signature 162c.

The information processing apparatus 110 regularly sends an acquisition request to the external server 150. If it is detected that a newly acquired global IP address is different from a previously acquired global IP address, the control unit 111 generates a new second server certificate 162 by using the newly acquired global IP address. Then, the control unit 111 deletes the previous second server certificate 162 stored in the storage unit 112, and causes the storage unit 112 to store the newly generated second server certificate 162.

Information for connection to the external server 150, such as a uniform resource locator (URL) or an IP address, is previously stored in the storage unit 112 before shipment of the information processing apparatus 110 or is set so that the user of the information processing apparatus 110 can input or change it later.

To establish HTTPS communication normally, the route certificate 160 stored in the information processing apparatus 110 is needed. Thus, it is assumed that in the communication system 100, there is a way for acquiring the route certificate 160 from the information processing apparatus 110, and the route certificate 160 has been stored in the local PC 120 and the outside PC 140 to which HTTPS communication is to be established.

Since the route certificate 160 contains no confidential information, the route certificate 160 may be available to anyone without the need to prevent unauthorized leakage.

Next, description will be given on a process in which the control unit 111 of the information processing apparatus 110 selects from the first server certificate 161 and the second server certificate 162 and transmits the selected certificate to a source of a connection request.

FIG. 4 is a table for explaining address conversion by the NAT router 130 and a destination IP address recognized by the information processing apparatus 110.

The outside PC 140 is assigned with the second global IP address, and thus, the source IP address is the second global IP address. Since the outside PC 140 is connected to the information processing apparatus 110 via the NAT router 130, the destination IP address at the time of transmission by the outside PC 140, that is, the destination IP address before NAT conversion, is the first global IP address. The NAT router 130 rewrites the destination IP address to the first private IP address assigned to the information processing apparatus 110, and thus, the destination IP address recognized by the information processing apparatus 110 is the first private IP address.

On the other hand, since the local PC 120 belongs to the same subnet as the information processing apparatus 110, the source IP address is the second private IP address assigned to the local PC 120, and the destination IP address at the time of transmission is the first private IP address assigned to the information processing apparatus 110. The destination IP address recognized by the information processing apparatus 110 is also the first private IP address.

As shown in FIG. 2, the communication unit 113 included in the information processing apparatus 110 is only one, and thus, all destination IP addresses recognized by the information processing apparatus 110 are the same.

On the other hand, source IP addresses recognized by the information processing apparatus 110 are significantly different. Thus, the control unit 111 determines which one of the first server certificate 161 and the second server certificate 162 is to be selected based on the source IP address. Specifically, in the first embodiment, the control unit 111 acquires the source IP address of the source of a connection request for HTTPS communication that is secure communication. If the source IP address belongs to the same subnet as the information processing apparatus 110, the control unit 111 selects the first server certificate 161 that includes the first private IP address, and otherwise, selects the second server certificate 162 that includes the first global IP address.

The storage unit 112 stores information necessary for processing by the information processing apparatus 110. For example, the storage unit 112 stores the route certificate 160 and the secret key 160e paired with the public key 160d included in the route certificate 160, the first server certificate 161 and the secret key 161e paired with the public key 161d included in the first server certificate 161, and the second server certificate 162 and the secret key 162e paired with the public key 162d included in the second server certificate 162.

In addition, the storage unit 112 stores the first private IP address assigned to the information processing apparatus 110, and information for connection to the external server 150.

The storage unit 112 can be implemented by a storage device such as a hard disk drive (HDD) or a nonvolatile memory.

The communication unit 113 is a communication interface for communication with the LAN 101. For example, the communication unit 113 receives a connection request for communication established by using one of a plurality of server certificates. The communication unit 113 transmits a single server certificate selected out of the plurality of server certificates according to the source IP address of the connection request, to the source of the connection request.

Specifically, the communication unit 113 can be implemented by a network interface card (NIC).

The input unit 114 receives an input of operation.

The input unit 114 can be implemented by an input device such as a key device.

As illustrated in FIG. 5A, for example, a part or whole of the control unit 111 described above can be configured by a memory 10, and a processor 11, such as a central processing unit (CPU), that executes a program stored in the memory 10. Such a program may be provided through a network, or may be provided while being recorded on a recording medium. That is, such a program may be provided as a program product.

As illustrated in FIG. 5B, for example, a part of the control unit 111 may also be configured by a processing circuit 12 such as a single circuit, a composite circuit, a programmed processor, a parallel-programmed processor, an application specific integrated circuit (ASIC) or a field programmable gate array (FPGA).

Second Embodiment

Figure 6:
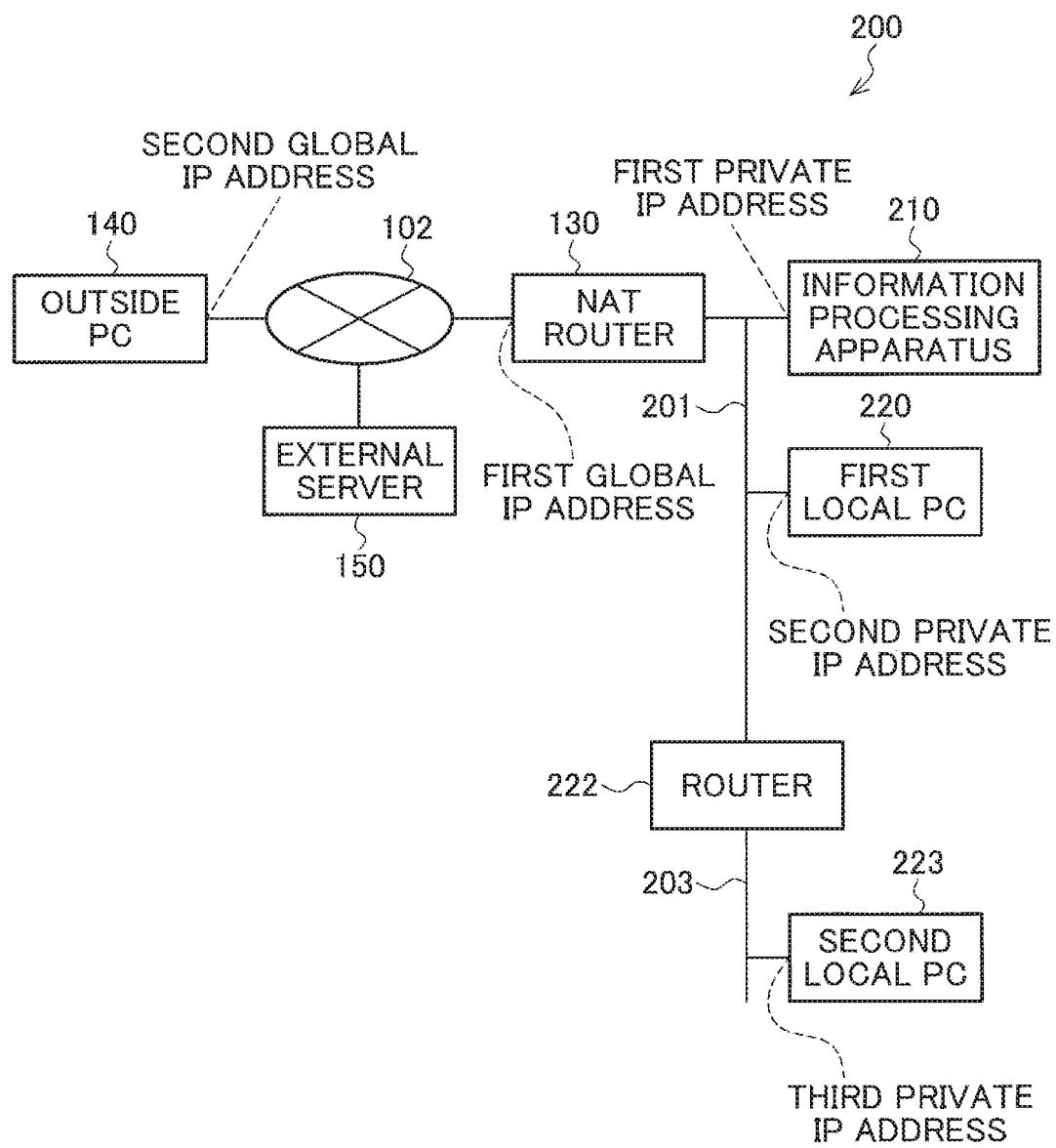
FIG. 6 is a block diagram schematically illustrating a configuration of a communication system according to the second embodiment.

FIG. 6 is a block diagram schematically illustrating a configuration of a communication system 200 according to a second embodiment.

As illustrated in the drawing, the communication system 200 includes an information processing apparatus 210, a first local PC 220, an NAT router 130, an outside PC 140, an external server 150, a router 222, and a second local PC 223.

The NAT router 130, the outside PC 140, and the external server 150 of the communication system 200 according to the second embodiment are respectively similar to the NAT router 130, the outside PC 140, and the external server 150 of the communication system 100 according to the first embodiment.

The information processing apparatus 210, the first local PC 220, the NAT router 130, and the router 222 are connected to a first LAN 201, which is a first network. The first LAN 201 in the second embodiment is similar to the LAN 101 in the first embodiment.

The NAT router 130, the outside PC 140, and the external server 150 are connected to an Internet 102, which is a second network.

The router 222 and the second local PC 223 are connected to a second LAN 203, which is a third network.

To the information processing apparatus 210, a first private IP address is assigned. To the first local PC 220, a second private IP address is assigned. The information processing apparatus 210 and the first local PC 220 belong to the first LAN 201, that is, the same subnet. Thus, network portions of the first private IP address and the second private IP address are the same.

To the second local PC 223, a third private IP address is assigned. The second local PC 223 belongs to the second LAN 203 that is a subnet different from the subnet to which the information processing apparatus 210 and the first local PC 220 belong. Thus, a network portion of the third private IP address is different from the network portions of the first private IP address and the second private IP address.

In the communication system 200 according to the second embodiment, the plurality of LANs 201 and 203 are present at one location, and the information processing apparatus 210 is connected to one of the LANs, that is, the first LAN 201. As the LAN 101 in the first embodiment, the first LAN 201 is connected to the Internet 102 via the NAT router 130. The second LAN 203 is connected to the first LAN 201 with the router 222 that does not perform an NAT operation.

In the case of HTTPS connection from the second local PC 223 to the information processing apparatus 210, the first LAN 201 and the second LAN 203 are different subnets. If the information processing apparatus 210 performs processing similar to that of the information processing apparatus 110 in the first embodiment, the second server certificate 162 that includes the first global IP address is unintentionally included in a response to the second local PC 223.

However, in the communication system 200 illustrated in FIG. 6, the second local PC 223 is connected to the information processing apparatus 210 by using the first private IP address as a destination IP address. Thus, the information processing apparatus 210 should respond to the second local PC 223 with the first server certificate 161 including the first private IP address.

As illustrated in FIG. 2, the information processing apparatus 210 in the second embodiment includes a control unit 211, a storage unit 112, a communication unit 113, and an input unit 114.

The storage unit 112, the communication unit 113, and the input unit 114 of the information processing apparatus 210 in the second embodiment are similar to the storage unit 112, the communication unit 113, and the input unit 114 of the information processing apparatus 110 in the first embodiment.

The control unit 211 controls processing in the information processing apparatus 210. The control unit 211 in the second embodiment is different from the control unit 111 in the first embodiment in processing of selecting a server certificate to be transmitted according to the source IP address. For example, in the second embodiment, the control unit 211 changes a server certificate selected out of a plurality of server certificates depending on whether the source IP address of a connection request for communication established by using server certificates is a global IP address or a private IP address.

Specifically, the control unit 211 in the second embodiment acquires the source IP address of a source of a connection request for HTTPS communication. If the source IP address is the private IP address, the control unit 211 selects the first server certificate 161 that includes the first private IP address, and otherwise, selects the second server certificate 162 that includes the first global IP address.

Specifically, if the source IP address is one of a private IP address 10.0.0.0/8 of class A, a private IP address 172.16.0.0/12 of class B, or a private IP address 192.168.0.0/16 of class C in a handshake of a SSL/TLS (Transport Layer Security) protocol for HTTPS communication, the control unit 211 selects the first server certificate 161, and otherwise, selects the second server certificate 162.

It is determined that the private IP addresses of classes A through C are not used as global IP addresses, and in most cases, IP addresses assigned in a subnet of a local network are private IP addresses of classes A through C.

Third Embodiment

Figure 7:
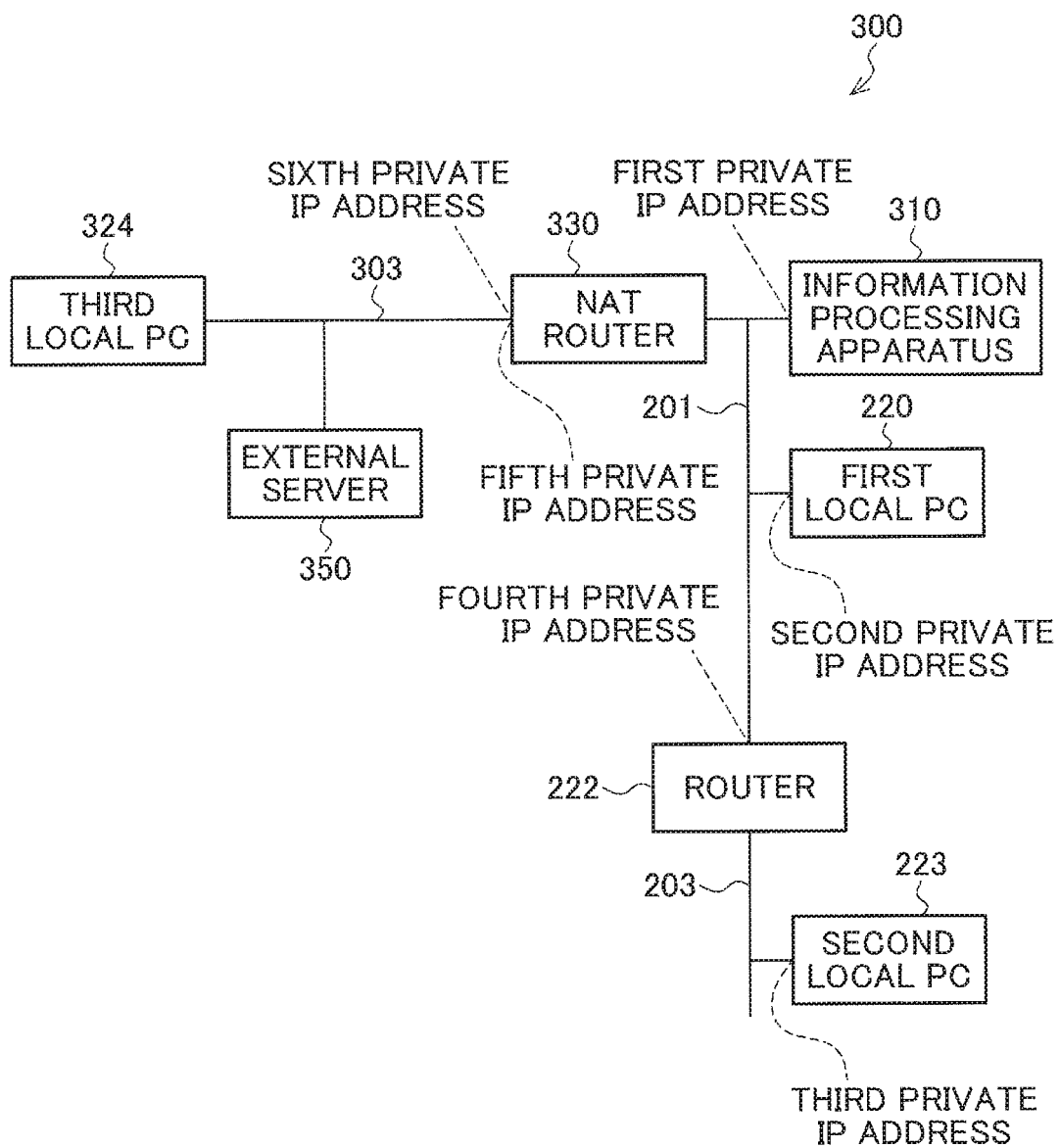
FIG. 7 is a block diagram schematically illustrating a configuration of a communication system according to the third embodiment.

FIG. 7 is a block diagram schematically illustrating a configuration of a communication system 300 according to a third embodiment.

As illustrated in FIG. 7, the communication system 300 includes an information processing apparatus 310, a first local PC 220, a router 222, a second local PC 223, an NAT router 330, a third local PC 324, and an external server 350.

The first local PC 220, the router 222, and the second local PC 223 of the communication system 300 in the third embodiment are respectively similar to the first local PC 220, the router 222, and the second local PC 223 of the communication system 200 in the second embodiment.

The information processing apparatus 310, the first local PC 220, the NAT router 330, and the router 222 are connected to a first LAN 201, which is a first network.

The NAT router 330, the third local PC 324, and the external server 350 are connected to a third LAN 303, which is a second network.

The router 222 and the second local PC 223 are connected to a second LAN 203, which is a third network.

To the information processing apparatus 310, a first private IP address is assigned. To the first local PC 220, a second private IP address is assigned. To the router 222, a fourth private IP address is assigned for communication in the first LAN 201. To the NAT router 330, a fifth private IP address is assigned for communication in the first LAN 201. The information processing apparatus 210, the first local PC 220, the router 222, and the NAT router 330 belong to the same subnet, that is, the first LAN 201. Thus, network portions of the first private IP address, the second private IP address, the fourth private IP address, and the fifth private IP address are the same.

To the second local PC 223, a third private IP address is assigned. The second local PC 223 belongs to the second LAN 203 that is a subnet different from the subnet to which the information processing apparatus 210 and the first local PC 220 belong. Thus, a network portion of the third private IP address is different from the network portions of the first private IP address and the second private IP address.

To the NAT router 330, a sixth private IP address is also assigned for communication in the third LAN 303. The NAT router 330 also belongs to the third LAN 303 that is a subnet different from the subnet to which the information processing apparatus 210 and the first local PC 220 belong. Thus, a network portion of the sixth private IP address is different from the network portions of the first private IP address and the second private IP address. The sixth private IP address is also referred to as a preconversion IP address.

In the communication system 300 illustrated in FIG. 7, the NAT router 330 is connected to the first LAN 201 to which the information processing apparatus 310 is connected. Unlike the first and second embodiments, the NAT router 330 is connected not to the Internet but to the third LAN 303. Communication from the first LAN 201 to the third LAN 303 can be freely established, but communication from the third LAN 303 to the first LAN 201 cannot be freely established.

However, when static processing to the first LAN 201 is set in the NAT router 330, the third local PC 324 connected to the third LAN 303 can be connected to the information processing apparatus 310 in the first LAN 201 by connecting to the sixth private IP address assigned to the NAT router 330.

On the other hand, since the router 222 does not have an NAT function, the second local PC 223 in the second LAN 203 can communicate directly with the first private IP address of the information processing apparatus 310.

The information processing apparatus 310 needs to respond with different server certificates to the third local PC 324, the first local PC 220, and the second local PC 223.

As illustrated in FIG. 2, the information processing apparatus 310 in the third embodiment includes a control unit 311, a storage unit 312, a communication unit 113, and an input unit 114.

The communication unit 113 and the input unit 114 of the information processing apparatus 310 in the third embodiment are similar to the communication unit 113 and the input unit 114 of the information processing apparatus 110 in the first embodiment.

The control unit 311 controls processing in the information processing apparatus 310. For example, the control unit 311 generates a route certificate and a server certificate. Specifically, the control unit 311 generates a route certificate, a first server certificate that is a server certificate for the first LAN 201, and a third server certificate that is a server certificate for the third LAN 303.

The control unit 311 selects a server certificate to be transmitted, according to the source IP address. For example, in the third embodiment, the control unit 311 refers to server certificate selection information for selecting a single server certificate out of a plurality of server certificates to thereby select a single server certificate out of a plurality of server certificates according to a source IP address of a connection request for communication established by using the server certificate.

Figure 8A:
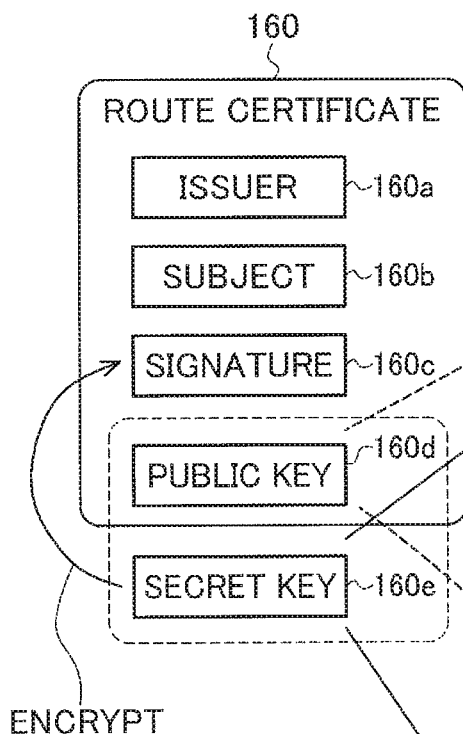
FIGS. 8A through 8C are schematic diagrams illustrating examples of a route certificate, a first server certificate, and a second server certificate in the third embodiment.
Figure 8B:
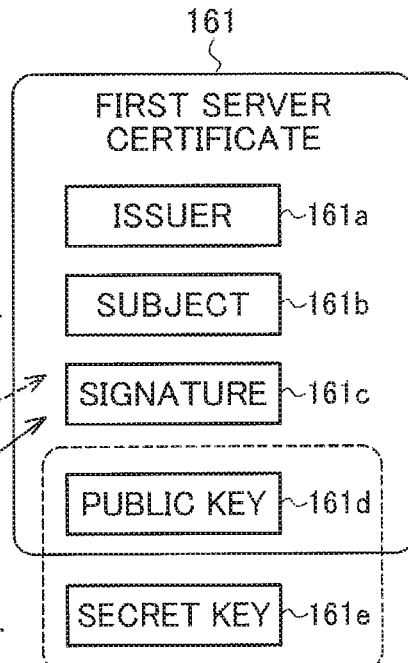

First, with reference to FIGS. 8A through 8C, the server certificates will be described.

The route certificate 160 and the first server certificate 161 in the third embodiment are similar to the route certificate 160 and the first server certificate 161 in the first embodiment.

To generate a third server certificate 363, the control unit 311 acquires the sixth private IP address assigned to the NAT router 330. Regarding a method of acquiring the sixth private IP address, as in the first embodiment, there are methods such as a method of receiving an input by the user via the input unit 114, and a method of sending an address acquisition request to the external server 350 and receiving a response that includes the sixth private IP address from the external server 350.

Here, processing of the external server 350 in the third embodiment is similar to the processing of the external server 150 in the first embodiment.

Figure 8C:
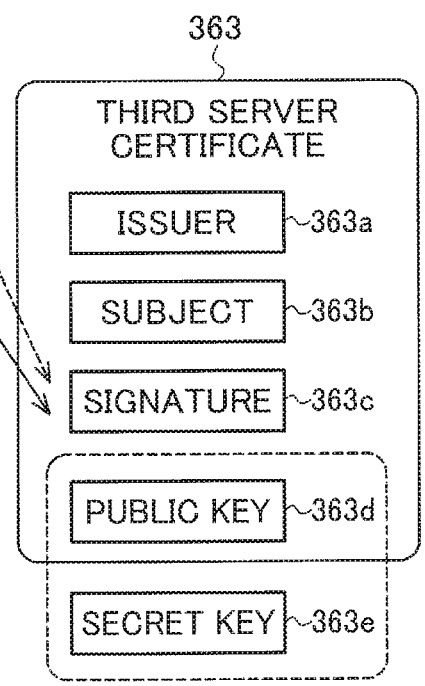

When the control unit 311 acquires the sixth private IP address of the NAT router 330 by a manual input by the user or a response from the external server 350, the control unit 311 generates a pair of a public key 363d and a secret key 363e and then generates a third server certificate 363 as illustrated in FIG. 8C by using a route certificate 160 such that a subject 362b is the sixth private IP address. Specifically, the control unit 311 sets the subject 160b of the route certificate 160 as an issuer 363a of the third server certificate 363. Based on the contents of the third server certificate 363, the control unit 311 encrypts predetermined information with a secret key 160e corresponding to the route certificate 160 to thereby generate a signature 363c.

The information processing apparatus 310 regularly sends an address acquisition request to the external server 350. If it is detected that a newly acquired private IP address is different from a previously acquired private IP address, the control unit 311 generates a new third server certificate 363 by using the newly acquired private IP address. Then, the control unit 311 deletes the previous third server certificate 363 stored in the storage unit 312, and causes the storage unit 312 to store the newly generated third server certificate 363.

Information for connection to the external server 350 is previously stored in the storage unit 312 before shipment of the information processing apparatus 310, or is set so that the user of the information processing apparatus 310 can input or change it later.

Description will now be given on a process in which the control unit 311 of the information processing apparatus 310 selects the first server certificate 161 and the third server certificate 363 and transmits the first server certificate 161 and the third server certificate 363 to a source of an HTTPS communication connection request.

In the communication system 300 illustrated in FIG. 7, in order to establish IP communication, it is necessary to appropriately set a routing table of the information processing apparatus 310. The routing table is a table showing routes of different networks, and is essential for IP communication. Specifically, the routing table indicates, when an own device belonging to a network performs packet transmission to another network different from the network, to which IP address in the network to which the own device belongs the transmission should be performed.

FIG. 9 is a schematic diagram showing an example of a routing table set in the information processing apparatus 310 in order to establish communication correctly in the communication system 300 illustrated in FIG. 7.

A routing table 370 shown in FIG. 9 includes a destination network column 370a and a gateway address column 370b.

The destination network column 370a stores a destination IP address that is an IP address of a network as a destination.

The gateway address column 370b shows a gateway address that is a private IP address in the first LAN 201 to which a packet is transmitted in transmitting the packet to a destination IP address stored in a corresponding row of the destination network column 370a. The private IP address stored in the gateway address column 370b must be an IP address belonging to the same subnet as the first private IP address assigned to the information processing apparatus 310.

That is, in the routing table 370, each of a plurality of gateway addresses corresponds to one of a plurality of destination IP addresses.

For example, in a first row 370c, a private IP address assigned to the subnet of the second LAN 203 is stored in the destination network column 370a, and in transmitting a packet to the second LAN 203, the fourth private IP address assigned to the router 222 as a destination of transmission from the information processing apparatus 310 in the first LAN 201 is stored in the gateway address column 370b.

In a second row 370d, a private IP address assigned to the subnet of the third LAN 303 is stored in the destination network column 370a, and in transmitting a packet to the third LAN 303, the fifth private IP address assigned to the NAT router 330 as a destination of transmission from the information processing apparatus 310 in the first LAN 201 is stored in the gateway address column 370b.

In a third row 370e, a value indicating an arbitrary IP address is stored in the destination network column 370a, and in transmitting a packet to the arbitrary IP address, the fifth private IP address assigned to the NAT router 330 as a default gateway address of transmission from the information processing apparatus 310 in the first LAN 201 is stored in the gateway address column 370b. In a case where a network of a destination is not present in other rows, that is, in the case of transmitting a packet to a network other than the first LAN 201, the second LAN 203, and the third LAN 303, the information processing apparatus 310 transmits the packet to the NAT router 330.

In general, with respect to the routing table 370, the user of the information processing apparatus 310 sets the information processing apparatus 310.

With the routing table 370 described above, the information processing apparatus 310 is capable of transmitting a packet to a different network.

In view of this, server certificate selection information for selecting a server certificate is generated in setting the routing table 370 so that the user of the information processing apparatus 310 can select a server certificate appropriately.

For example, the server certificate selection information indicates a server certificate to be selected for each gateway address set in the routing table 370. In the third embodiment, the server certificate selection information indicates two options: the first server certificate 161 including the first private IP address; and the third server certificate 363 including the fifth private IP address assigned to the NAT router 330.

FIG. 10 is a schematic diagram illustrating an example of the server certificate selection information.

FIG. 10 shows a server certificate selection table 371 as an example of the server certificate selection information.

The server certificate selection table 371 includes a gateway address column 371a and a server certificate row 371b.

The gateway address column 371a stores a gateway address stored in the routing table 370.

The server certificate row 371b stores information indicating a server certificate to be selected for a gateway address stored in a corresponding row.

That is, in the server certificate selection table 371, each of a plurality of server certificates corresponds to one of a plurality of gateway addresses.

With the use of the server certificate selection table 371 described above, when the information processing apparatus 310 illustrated in FIG. 2 receives a connection request for HTTPS communication, the control unit 311 of the information processing apparatus 310 refers to the routing table 370 in handshake of the SSL/TLS protocol of the HTTPS communication to thereby specify a destination IP address that coincides with a source IP address of the connection request and specify a gateway address corresponding to the specified destination IP address. Then, the control unit 311 refers to the server certificate selection table 371 to select a server certificate corresponding to the specified gateway address.

In a case where the source IP address of the connection request is the private IP address of the first LAN 201 that is the subnet of the information processing apparatus 310, the control unit 311 selects the first server certificate 161 while referring to neither the routing table 370 nor the server certificate selection table 371.

The storage unit 312 stores information necessary for processing in the information processing apparatus 310. For example, the storage unit 312 stores the route certificate 160 and the secret key 160e paired with the public key 160d included in the route certificate 160, the first server certificate 161 and the secret key 161e paired with the public key 161d included in the first server certificate 161, and the third server certificate 363 and the secret key 363e paired with the public key 363d included in the third server certificate 363.

The storage unit 312 stores the first private IP address assigned to the information processing apparatus 310, and information for connection to the external server 350.

In addition, the storage unit 312 stores the routing table 370 and the server certificate selection table 371.

In the third embodiment described above, the server certificate is selected by referring to the routing table 370 and the server certificate selection table 371. Alternatively, the process of referring to the routing table 370 may be omitted.

For example, the user of the information processing apparatus 310 may generate a server certificate selection table 372 as shown in FIG. 11 as server certificate selection information.

As shown in FIG. 11, the server certificate selection table 372 includes a target network column 372a and a server certificate row 372b.

The target network column 372a stores a target IP address corresponding to a destination IP address stored in the destination network column 370a of the routing table 370.

The server certificate row 372b stores information indicating a server certificate to be selected in a case where the source IP address of a connection request for HTTPS communication coincides with a target IP address of a corresponding row.

With the use of the server certificate selection table 372 as described above, when the information processing apparatus 310 illustrated in FIG. 2 receives a connection request for HTTPS communication, the control unit 311 of the information processing apparatus 310 refers to the server certificate selection table 372 in handshake of the SSL/TLS protocol of HTTPS communication to thereby specify a target IP address that coincides with a source IP address of the connection request and specify a server certificate corresponding to the specified target IP address.

Figure 12:
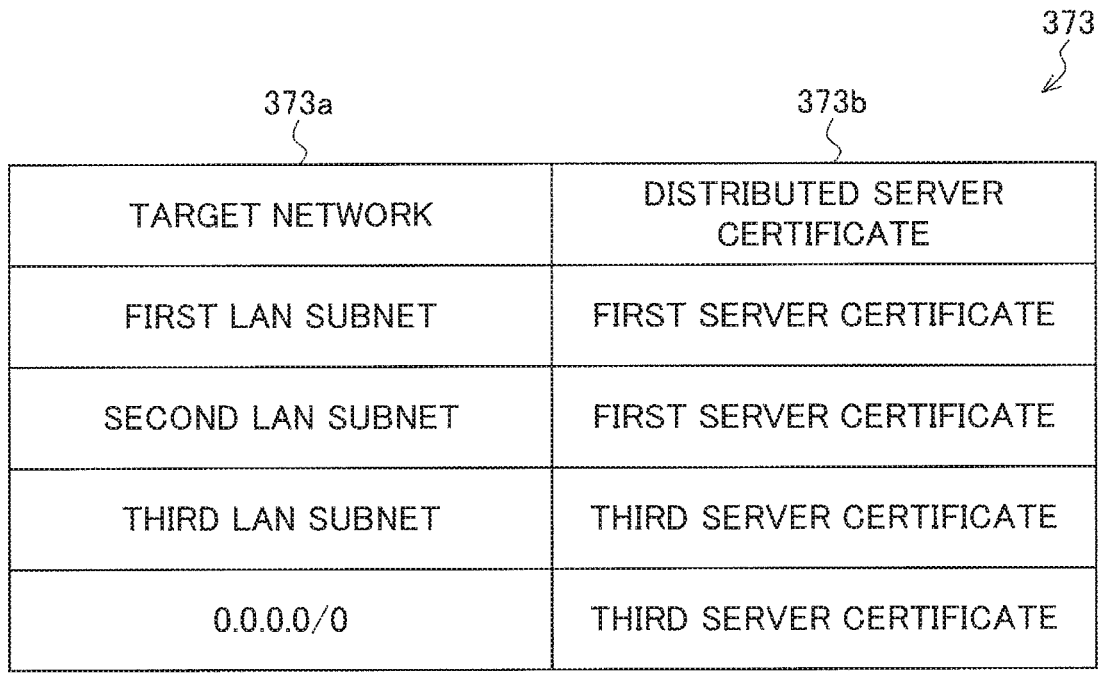
FIG. 12 is a schematic diagram illustrating a third example of the server certificate selection information in the third embodiment.

As shown in FIG. 12, for example, the user of the information processing apparatus 310 may generate a server certificate selection table 373 including an IP address of the first LAN 201 as the subnet to which the information processing apparatus 310 belongs.

Figure 13:
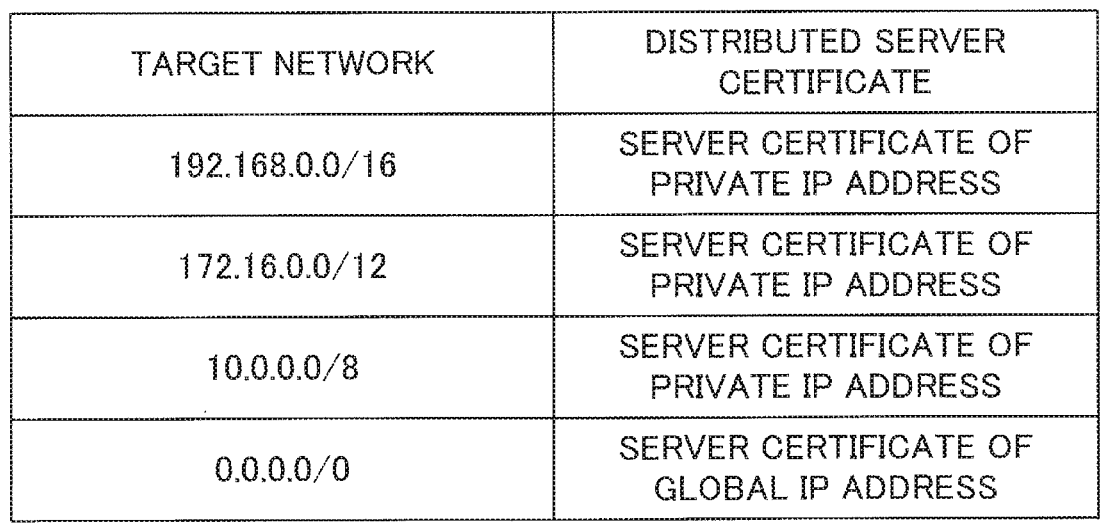
FIG. 13 is a schematic diagram illustrating a fourth example of the server certificate selection information in the third embodiment.

To cover all the first through third embodiments, the user of the information processing apparatus 310 may generate a server certificate selection table 374 as shown in FIG. 13. If the source IP address of the connection request is a private IP address, the server certificate selection table 374 shown in FIG. 13 indicates that a server certificate including a corresponding private IP address for each subnet to which the source IP address of the connection request belongs is selected. If the source IP address of the connection request is not a private IP address, the server certificate selection table 374 indicates that a server certificate including a global IP address used for connection to the Internet is selected.

Fourth Embodiment

The first through third embodiments described above are based on the assumption that when connection to the information processing apparatuses 110 through 310 is established in HTTPS communication, the connection to the information processing apparatuses 110 through 310 is established by using IP addresses. However, in some cases, the connection to the information processing apparatuses 110 through 310 may be established by using domain names. In the fourth embodiment, a case of using domain names in a configuration similar to that of the first embodiment will be described below.

Figure 14:
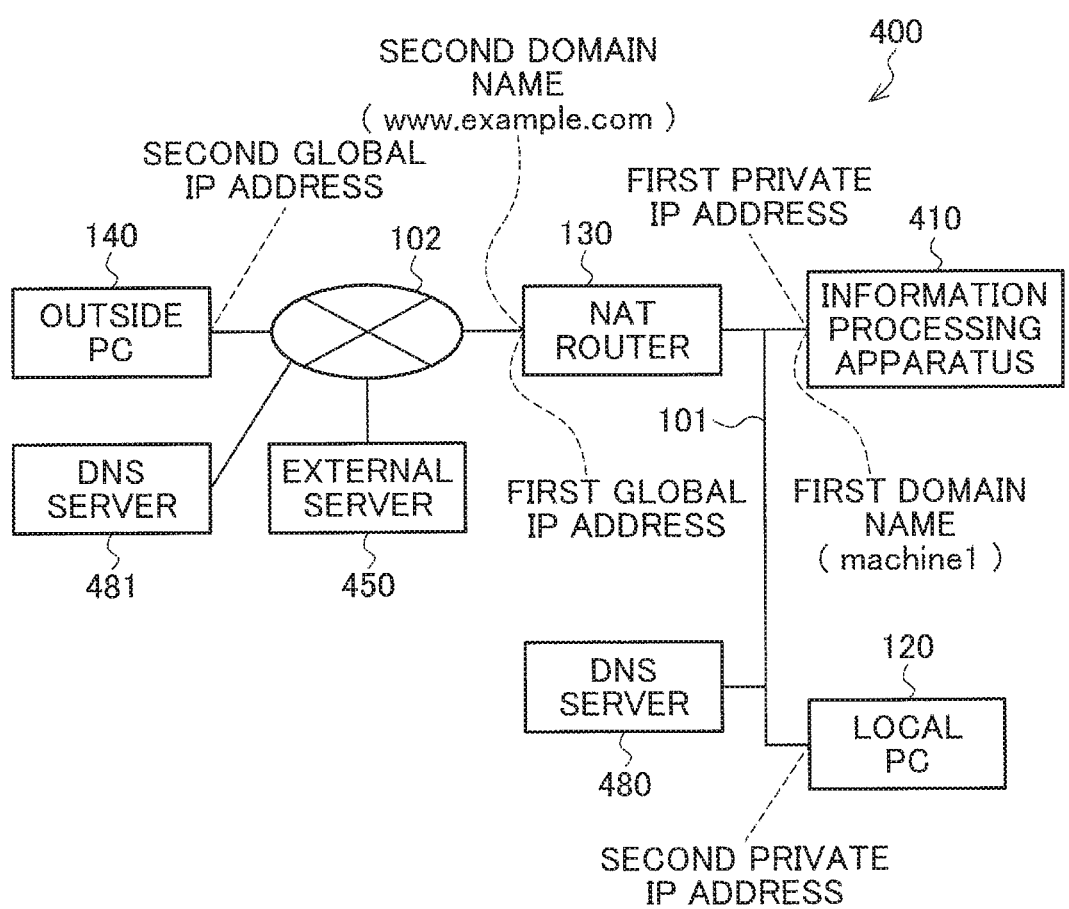
FIG. 14 is a block diagram schematically illustrating a configuration of a communication system according to the fourth embodiment.

FIG. 14 is a block diagram schematically illustrating a configuration of a communication system 400 according to the fourth embodiment.

As illustrated in FIG. 14, the communication system 400 includes an information processing apparatus 410, a local PC 120, an NAT router 130, an outside PC 140, an external server 450, and domain name system (DNS) servers 480 and 481.

The information processing apparatus 410, the local PC 120, the NAT router 130, and the DNS server 480 are connected to a LAN 101.

The NAT router 130, the outside PC 140, the external server 450, and the DNS server 481 are connected to the Internet 102.

The local PC 120, the NAT router 130, and the outside PC 140 of the communication system 400 according to the fourth embodiment are similar to the local PC 120, the NAT router 130, and the outside PC 140 of the communication system 100 according to the first embodiment. In the case of connection to the information processing apparatus 410, the local PC 120 designates a first domain name (e.g., machine1) to be converted by the DNS server 480 to a first private IP address assigned to the information processing apparatus 410 in the LAN 101. The local PC 120 is connected to the information processing apparatus 410 by acquiring the first private IP address corresponding to the first domain name from the DNS server 480. In other words, the first domain name is a domain name to be converted by the DNS to the first private IP address in the LAN 101.

In the case of connection to the information processing apparatus 410, the outside PC 140 also designates a second domain name (e.g., www.example.com) to be converted by the DNS server 481 to a first global IP address assigned to the NAT router 130 in the Internet 102. Then, the outside PC 140 acquires the first global IP address corresponding to the second domain name from the DNS server 481 to be thereby connected to the information processing apparatus 410. As in the first embodiment, the NAT router 130 converts the first global IP address to the first private IP address by static processing. In other words, the second domain name is a domain name to be converted by the DNS to the first global IP address in the Internet 102. In this embodiment, the second domain name is also referred to as a preconversion domain name.

As illustrated in FIG. 2, the information processing apparatus 410 of the fourth embodiment includes a control unit 411, a storage unit 412, a communication unit 113, and an input unit 114.

The communication unit 113 and the input unit 114 of the information processing apparatus 410 in the fourth embodiment are similar to the communication unit 113 and the input unit 114 of the information processing apparatus 110 in the first embodiment.

The control unit 411 controls processing in the information processing apparatus 410. For example, the control unit 411 generates a route certificate and a server certificate. Specifically, as illustrated in FIGS. 3A through 3C, the control unit 411 generates a route certificate 160, a first server certificate 161# that is a server certificate for the LAN 101, and a second server certificate 162# that is a server certificate for the Internet 102. The route certificate 160 is similar to the route certificate 160 in the first embodiment.

As in the first embodiment, when the control unit 411 acquires the first private IP address, the control unit 411 transmits an acquisition request to the DNS server 480 via the communication unit 113 to thereby perform a reverse lookup of the DNS by using the first private IP address and acquire the first domain name corresponding to the first private IP address from the DNS server 480.

Thereafter, the control unit 411 generates a pair of a public key 161d and a secret key 161e, and then generates a first server certificate 161# by using a route certificate 160 such that a subject 161b# is the first domain name. Specifically, the control unit 411 sets the subject 160b of the route certificate 160 as an issuer 161a of the first server certificate 161#. Based on the contents of the first server certificate 161#, the control unit 411 encrypts predetermined information with the secret key 160e corresponding to the route certificate 160 to thereby generate a signature 161c#.

The first server certificate 161# generated as above is stored in the storage unit 412.

The control unit 411 connects to the external server 450 via the communication unit 113. This communication may be either encrypted communication or non-encrypted communication, and may be either HTTP communication or other communication. Here, it is assumed that the information processing apparatus 410 transmits a request for acquiring a domain name to the external server 150.

In the case of communication from the information processing apparatus 410 to the external server 450, the NAT router 130 rewrites the source IP address from the first private IP address to the first global IP address, and transfers an acquisition request to the external server 450.

The external server 450 that has received such an acquisition request acquires the source IP address (the first global IP address here) and transmits an acquisition request to the DNS server 481 to thereby perform reverse lookup of the DNS by using the first global IP address and acquire a second domain name corresponding to the first global IP address from the DNS server 481.

Then, the external server 450 writes the acquired second domain name in communication data for response, and responds to the information processing apparatus 410.

In the case where the external server 450 and the information processing apparatus 410 communicate with each other by using HTTP, the external server 450 may operate as an HTTP server, acquire a source IP address acquired from a REMOTE_ADDR variable included in a received HTTP header to perform a reverse lookup of the DNS, write the acquired second domain name in an HTTP payload, and respond to the information processing apparatus 410 with the packet.

The information processing apparatus 410 that has received the response from the external server 450 acquires a second domain name of the NAT router 130 from communication data for response.

The information processing apparatus 410 may acquire the second domain name via the input unit 114 by manual input by the user.

As described above, when the second domain name is acquired by the manual input by the user or the response from the external server 450, the control unit 411 generates a pair of a public key 162$d$ and a secret key 162$e$ and then generates a second server certificate 162# by using the route certificate 160 such that the subject 162$b$# is the second domain name. Specifically, the control unit 411 sets a subject 160$b$ of the route certificate 160 as an issuer 162$a$ of the second server certificate 162#. Based on the contents of the second server certificate 162#, the control unit 411 encrypts predetermined information with the secret key 160$e$ corresponding to the route certificate 160 to thereby generate a signature 162$c$#.

The control unit 411 selects a server certificate to be transmitted according to the source IP address.

For example, the control unit 411 acquires a source IP address of a source that has transmitted a connection request for HTTPS communication. If the source IP address is the same subnet as the subnet to which the information processing apparatus 410 belongs, the control unit 411 selects the first server certificate 161# that includes the first domain name, and otherwise, selects the second server certificate 162# that includes the second domain name.

The storage unit 412 stores information necessary for processing in the information processing apparatus 410. For example, the storage unit 412 stores the route certificate 160 and the secret key 160$e$ paired with the public key 160$d$ included in the route certificate 160, the first server certificate 161# and the secret key 161$e$ paired with the public key 161$d$ included in the first server certificate 161#, and the second server certificate 162# and the secret key 162$e$ paired with the public key 162$d$ included in the second server certificate 162#.

In addition, the storage unit 412 stores the first private IP address assigned to the information processing apparatus 410, and information for connection to the external server 450.

As described above, whether to perform a reverse lookup of the DNS depends on the network operation policy, and thus, whether to perform a reverse lookup of the DNS may be selected in accordance with the setting of the information processing apparatus 410.

Instead of performing the reverse lookup of the DNS as described above, the user of the information processing apparatus 410 may input the first domain name and the second domain name via the input unit 114.

Although the fourth embodiment describes the case where domain names are used in the communication system 100 of the first embodiment as an example, domain names can also be used in the second and third embodiments in a manner similar to the above by performing a reverse lookup of the DNS or by receiving an input from a user.

What is claimed is:

1. An information processing apparatus comprising:
a storage device to store a plurality of server certificates different in subjects;
a communication interface to receive a connection request for communication to be established by using any one of the plurality of server certificates and to transmit a single server certificate to a source of the connection request, the single server certificate being selected out of the plurality of server certificates generated by the information processing apparatus serving as a certificate authority according to a source internet protocol (IP) address of the connection request; and
a processing circuitry to select the single server certificate, wherein
the processing circuitry changes a server certificate to be selected as the single server certificate out of the plurality of server certificates depending on whether the source IP address is a global IP address or a private IP address.

2. The information processing apparatus according to claim 1, wherein
the communication interface transmits an acquisition request to a server connected to a second network different from a first network to which the information processing apparatus is connected, via a network address conversion relay device configured to convert an IP address between the first network and the second network, thereby receiving from the server, as a response to the acquisition request, a preconversion IP address that is an IP address assigned to the network address conversion relay device in the second network or a preconversion domain name that is a domain name to be converted to the preconversion IP address in a domain name system (DNS) in the second network, and
the processing circuitry generates, as one of the plurality of server certificates, a server certificate using the preconversion IP address or the preconversion domain name for a corresponding subject.

3. An information processing method comprising:
receiving a connection request for communication established by using any one of a plurality of server certificates different in subjects;
transmitting a single server certificate to a source of the connection request, the single server certificate being selected out of the plurality of server certificates generated by an information processing apparatus serving as a certificate authority according to a source internet protocol (IP) address of the connection request; and
selecting the single server certificate, wherein
in selecting the single server certificate, a server certificate to be selected as the single server certificate out of the plurality of server certificates is changed depending on whether the source IP address is a global IP address or a private IP address.

\* \* \* \* \*